United States Patent [19]

Takeuchi

[11] Patent Number: 5,311,015

[45] Date of Patent: May 10, 1994

[54] ORIGINAL READING DEVICE WHEREIN A FRAME SUPPORTS BOTH THE ORIGINAL AND THE READING SCANNING SYSTEM

[75] Inventor: Yukitoshi Takeuchi, Yokohama, Japan

[73] Assignee: Canon Kabushiki Kaisha, Tokyo, Japan

[21] Appl. No.: 900,322

[22] Filed: Jun. 18, 1992

[30] Foreign Application Priority Data

Jun. 20, 1991 [JP] Japan .................................. 3-148645

[51] Int. Cl.⁵ ................................................ H01J 5/16
[52] U.S. Cl. ..................................... 250/234; 358/497
[58] Field of Search .............................. 250/234–236; 358/494, 497

[56] References Cited

U.S. PATENT DOCUMENTS

| | | | |
|---|---|---|---|
| 4,516,023 | 5/1985 | Morrill et al. | 250/235 |
| 4,609,818 | 9/1986 | Lennemann et al. | 250/234 |
| 4,709,147 | 11/1987 | Arai | 250/234 |
| 4,870,294 | 9/1989 | Hasegawa | 250/235 |
| 5,191,447 | 3/1993 | Pinard | 250/234 |

*Primary Examiner*—David C. Nelms
*Assistant Examiner*—S. B. Allen
*Attorney, Agent, or Firm*—Fitzpatrick, Cella, Harper & Scinto

[57] ABSTRACT

An original reading device includes an original mount for mounting an original, a reading scanning system for reading the original mounted on the original mount by scanning the original, and a frame for supporting the original mount. The reading scanning system is mounted on the frame at a back side of the frame.

19 Claims, 6 Drawing Sheets

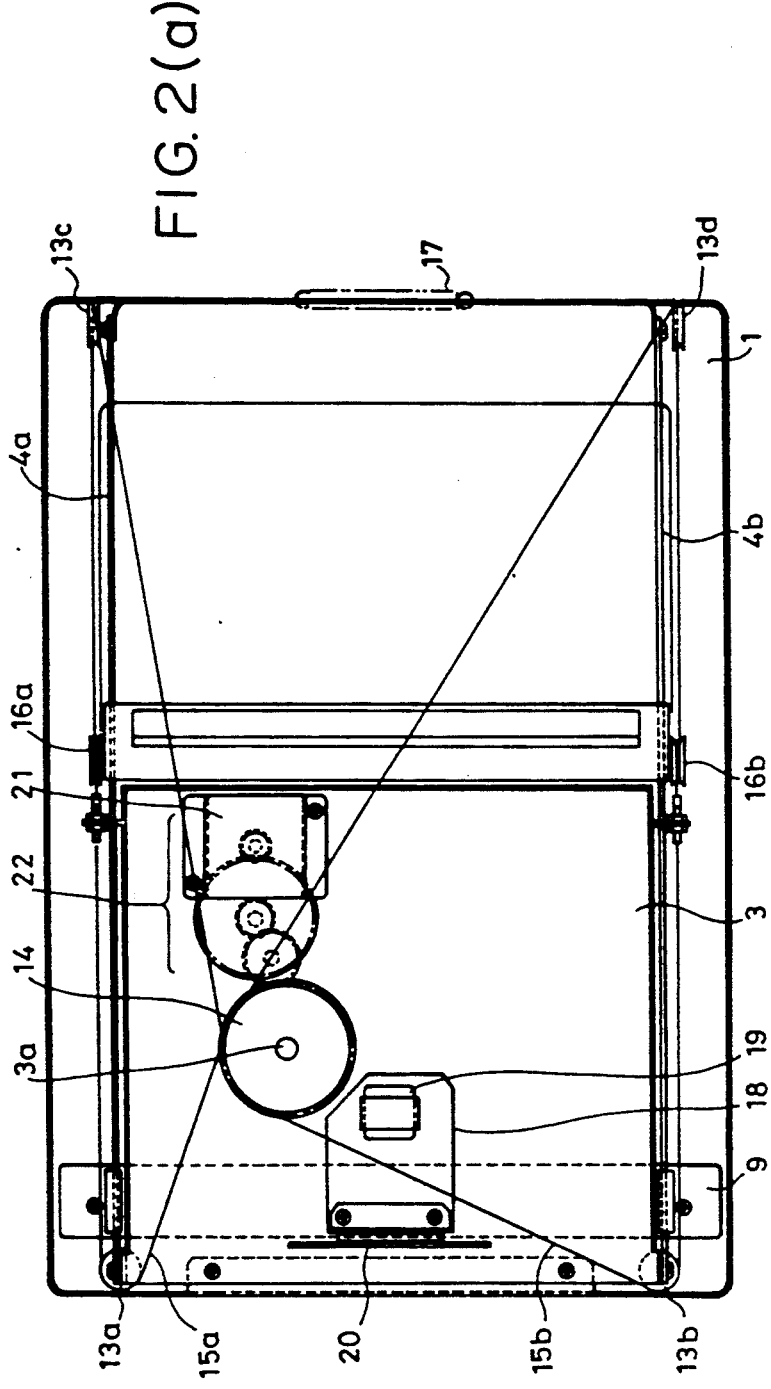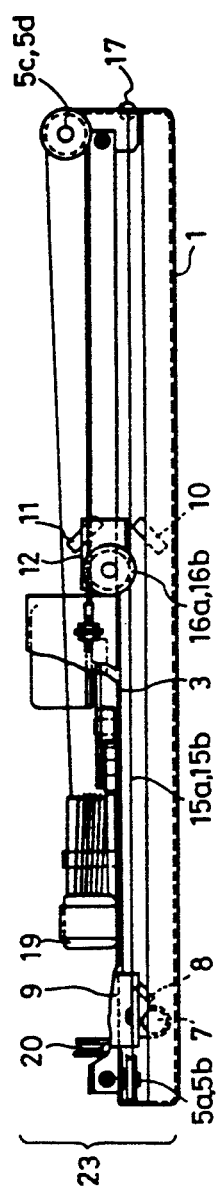

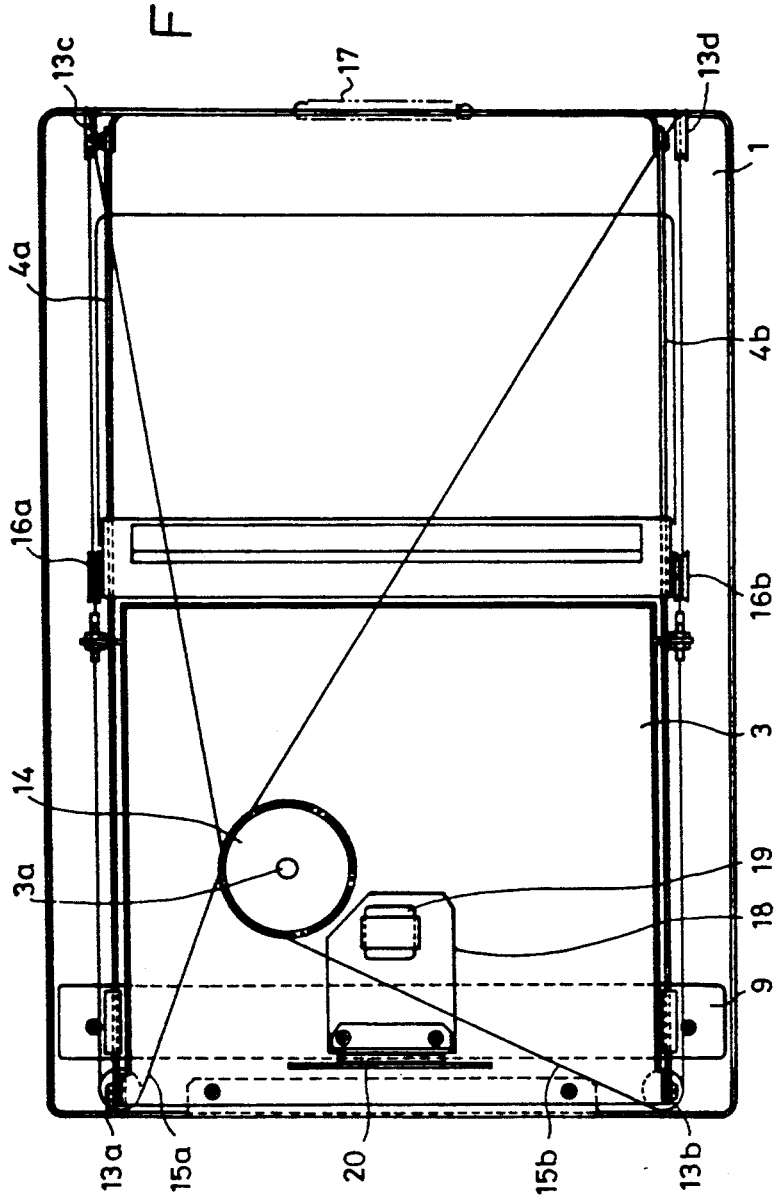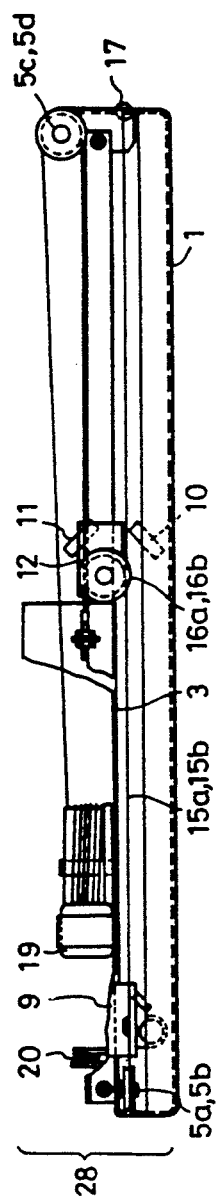

ORIGINAL READING DEVICE WHEREIN A FRAME SUPPORTS BOTH THE ORIGINAL AND THE READING SCANNING SYSTEM

BACKGROUND OF THE INVENTION

1. Field of the Invention

This invention relates to an original reading device which scans an original while moving and reads image light obtained from the original with a photosensor.

2. Description of the Related Art

In general, in an original reading device, such as an image scanner or the like, a so-called 1:½ optical system is mostly adopted in which an original mounted on original-mount glass is scanned using a light source and mirrors, and the image of the original is exposed on an image sensor or a photosensitive drum. In such a 1:½ optical system, as shown in FIGS. 5(a) and 5(b), an original P disposed on fixed original-mount glass 100 is illuminated by a light source 101, and image light reflected by mirrors 102, 103 and 104 is focused onto an image sensor 106 including a photosensor located near an imaging lens 105. A first scanning unit 107 that includes the light source 101 and the mirror 102, and a second scanning unit 108 that includes the mirrors 103 and 104 scan the range of the original-mount glass 100 at a speed ratio of 1:½ along a guide rail (not shown) provided on a base frame 109 by means of a driving force from a driving source (not shown). The imaging lens 105, the image sensor 106 and the driving source are fixedly mounted on the base frame 109. As shown in FIG. 6, a signal representing an image read by the image sensor 106 is amplified by an amplifier 110, is converted into digital values by an A/D converter 111, and is transmitted to an image processing circuit 112, where image processing, such as binary coding, γ-conversion or the like, is performed. The processed signal is transmitted to an external apparatus, such as a host computer, a personal computer or the like, via an interface circuit 113.

As shown in FIGS. 5(a) and 5(b), the device of this kind includes optical components, such as the first scanning unit 107, the second scanning unit 108, the lens 105, the image sensor 106 and the like, and driving-transmission components, such as a motor or the like, as principal components. The original-mount glass, a supporting member therefor, electric components and the like are mounted around the above-described principal components, and upper and lower covers are finally mounted.

In such a device, however, since the base frame is provided as a separate member, the number of components and the number of assembling processes inevitably increase, whereby it is very difficult to reduce the size of the device.

SUMMARY OF THE INVENTION

It is an object of the present invention to provide an original reading device in which the frame of an original mount also serves as the frame of a reading scanning system.

It is another object of the present invention to provide an original reading device whose height is reduced.

These and other objects, advantages and features of the present invention will become more apparent from the following description taken in connection with the accompanying drawings.

According to a first aspect of the present invention, an original reading device includes an original mount for mounting an original, a reading scanning system for reading the original mounted on the original mount by scanning the original while moving, and a frame for supporting the original mount. The reading scanning system is mounted on the frame on the back side of the frame. The frame includes a base frame of the reading scanning system. The frame may also include an external frame surrounding the original mount. The reading scanning system includes a first scanning unit provided with a light source and a first mirror, a second scanning unit provided with second and third mirrors for reflecting light from the first scanning unit, a lens for focusing light from the second scanning unit, a photosensitive member for receiving light passing through the lens, a guide member for guiding the movement of the first and second scanning units, and driving means for driving the first and second scanning units. The driving means includes a driving motor mounted on a portion of the device other than the frame. The driving motor may be mounted on a base cover of the main body of the device.

According to another aspect of the present invention, an original reading device includes a frame with first and second scanning units, an original mount, a lens cover, and an upper cover mounted on it. The frame is mounted on a base cover unit.

According to another aspect of the present invention, a method of using an original reading device includes placing an original on an original mount and scanning the original using a reading scanning system while moving. Both the original mount and the reading scanning system are mounted on a single frame.

According to another aspect of the present invention, a method of assembling an original reading device includes mounting first and second scanning units onto a frame, turning the frame and mounting an original mount on the frame, mounting the frame on a base cover unit, and mounting an upper cover on the frame.

BRIEF DESCRIPTION OF THE DRAWINGS

FIGS. 2(a) and 2(b) are diagrams showing a reading scanning unit of the device shown in FIGS. 1(a) and 1(b);

FIGS. 3(a) and 3(b) are diagrams showing a reading scanning unit according to a second embodiment of the present invention;

DETAILED DESCRIPTION OF THE PREFERRED EMBODIMENTS

Embodiments of the present invention will now be explained in detail with reference to the drawings.

Figure 1A:
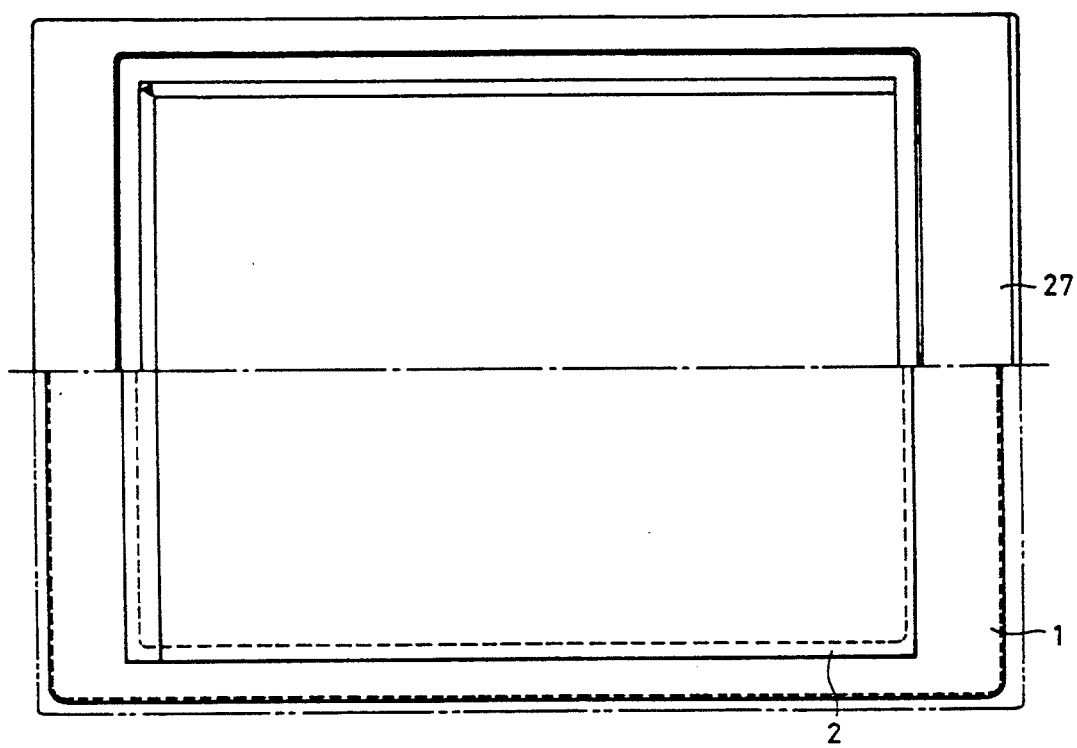
FIGS. 1(a) and 1(b) are diagrams showing an original reading device according to a first embodiment of the present invention.
Figure 1B:
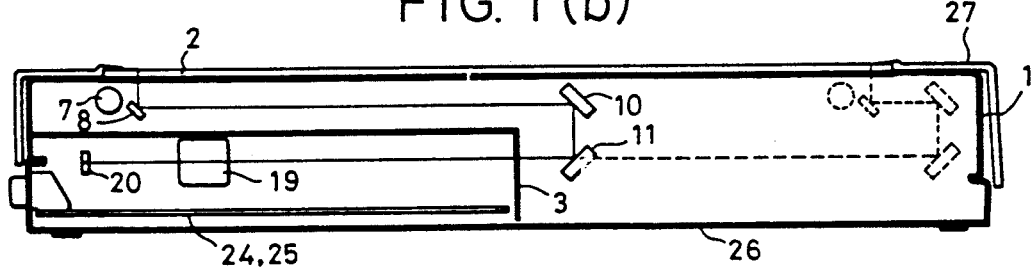

FIGS. 1(a), 1(b), 2(a) and 2(b) shown an original reading device according to a first embodiment of the present invention. FIG. 1(a) is a diagram showing the device as seen from above. FIG. 1(b) is a side view of the device. FIG. 2(a) is a diagram showing a reading scanning unit as seen from below (the back side). FIG. 2(b) is a side view of the reading scanning unit.

In FIGS. 1(a) through 2(b), an original mounted on original-mount glass 2 is illuminated by a light source 7. Light reflected by the original is reflected by reflecting mirrors 8, 10 and 11, and is focused onto an image sensor 20 by an imaging lens 19. The light source 7 and the reflecting mirror 8 are provided as a unit to form a first scanning unit 9. The reflecting mirrors 10 and 11 are also provided as a unit to form a second scanning unit 12, which is moved at a speed half the speed of the first scanning unit 9 by a driving system (to be described later). A frame 1 supports the original-mount glass 2. Components, such as a lens cover 3, a pair of rails 4a and 4b, posts 5a-5d serving as shafts of four pulleys, a scanning driving system and the like, are mounted on the back of the frame 1. The frame 1 also serves as a base frame for mounting the reading scanning system.

The configuration of the device will be further explained in the order of assembling processes. The first scanning unit 9 mounting the light source 7 and the first mirror 8, and the second scanning unit 12 mounting the second mirror 10 and the third mirror 11 are assembled along the rails 4a and 4b. Idle pulleys 13a-13d are mounted on the posts 5a-5d, respectively. A driving pulley 14 is mounted on a shaft 3a on the lens cover 3, and driving wires 15a and 15b are wound around the driving pulley 14. One end of each of of the driving wires 15a and 15b is fixed to the frame 1 after being fixed to the first scanning unit 9 and half wound around pulleys 16a and 16b provided at both ends of the second scanning unit 12, respectively. The other ends of the driving wires 15a and 15b are connected to a spring 17 after turning around the idle pulleys 13c and 13d provided at the right side of the frame 1 and being half wound around the pulleys 16a and 16b, respectively.

A CCD (charge-coupled device) unit 18 includes a lens 19 and a CCD 20, serving as a photosensor. The lens 19 is previously arranged so as to focus on the CCD 20. The CCD unit 18 is mounted at a predetermined position on the lens cover 3, and adjustment of magnification, reading position and the like is performed.

A driving unit 22 including a motor 21 and a reduction gear train is then mounted to provide an optical reading scanning unit 23.

The frame 1 bearing the optical reading scanning unit 23 is turned, the original-mount glass 2 is mounted thereon, and the frame 1 is then mounted on a base cover unit 26 which mounts a control board 24 and a power supply 25. Finally, an upper cover 27 is mounted to provide the device as shown in FIGS. 1(a) and 1(b).

As described above, in the present embodiment, since the original-mount glass and the reading scanning system are supported on the same frame without separately providing a base frame for the reading scanning system, it is possible to reduce the number of components and the size of the device. Hence, the present embodiment has a big advantage from the viewpoint of freedom of design and accurate placement of components.

Although, in the present embodiment, an explanation has been provided of a configuration in which the original-mount glass is mounted from the surface side of the base frame, the original-mount glass may be mounted from the back side of the base frame. In such a case, an assembling procedure may be considered in which the base frame is turned and mounted on the original-mount glass, and other components, such as the first scanning unit, the second scanning unit and the like, are mounted thereafter.

Next, a second embodiment of the present invention will be explained with reference to FIGS. 3(a), 3(b), 4(a) and 4(b). In FIGS. 3(a) through 4(b), components having the same functions as in the first embodiment are indicated by the same reference numerals, and an explanation will be provided mainly about portions which are different from the first embodiment.

Figure 4A:
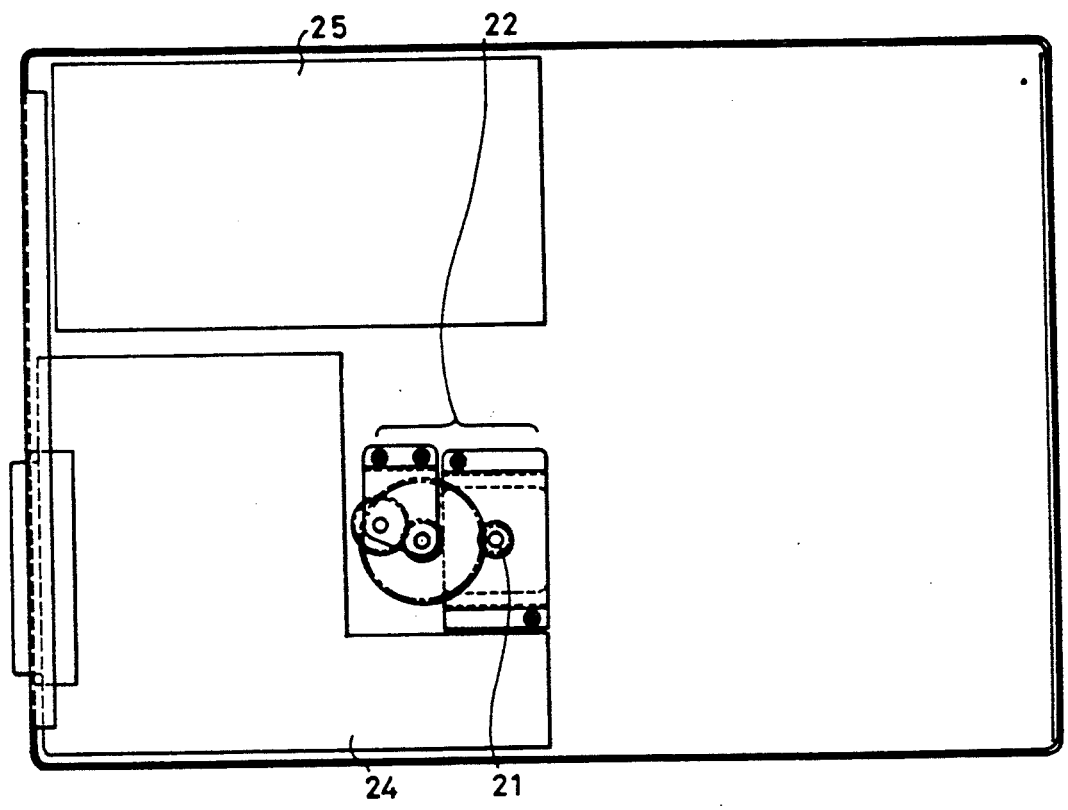
FIGS. 4(a) and 4(b) are diagrams showing a base cover unit of the second embodiment.
Figure 4B:
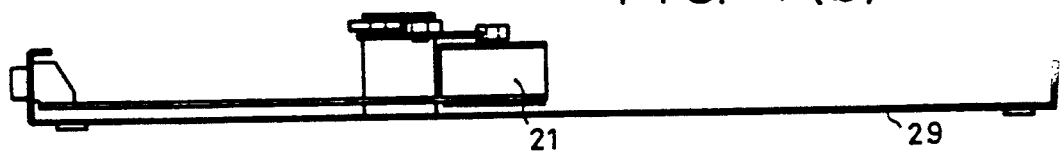
Figure 5A:
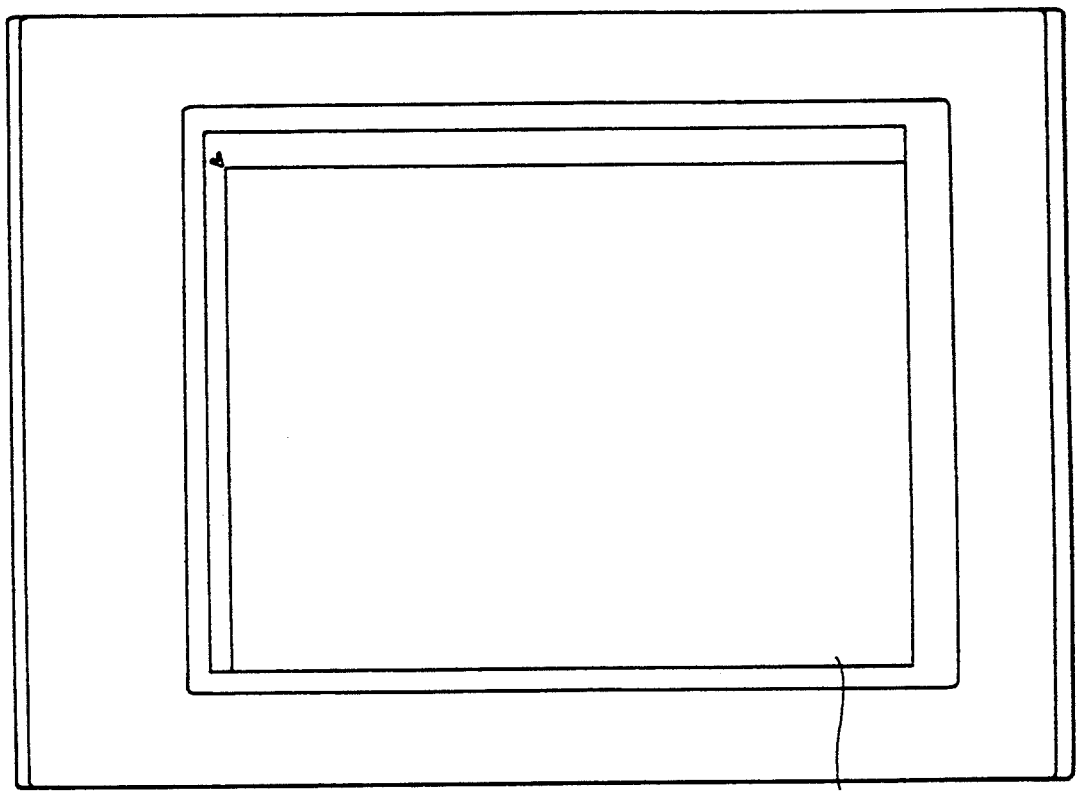
FIGS. 5(a) and 5(b) are diagrams showing a conventional original reading device.
Figure 5B:
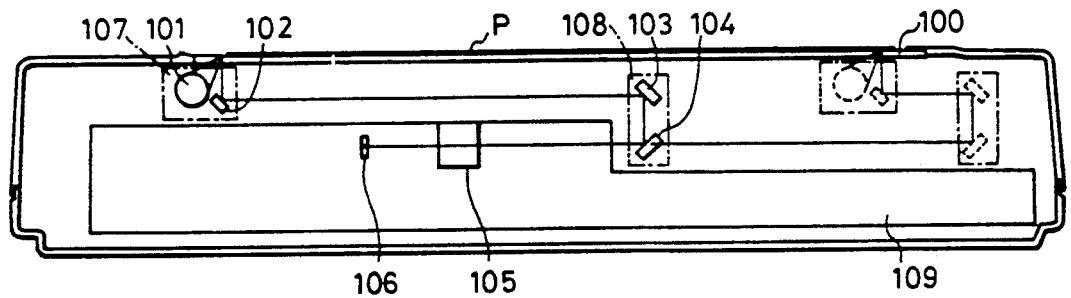
Figure 6:
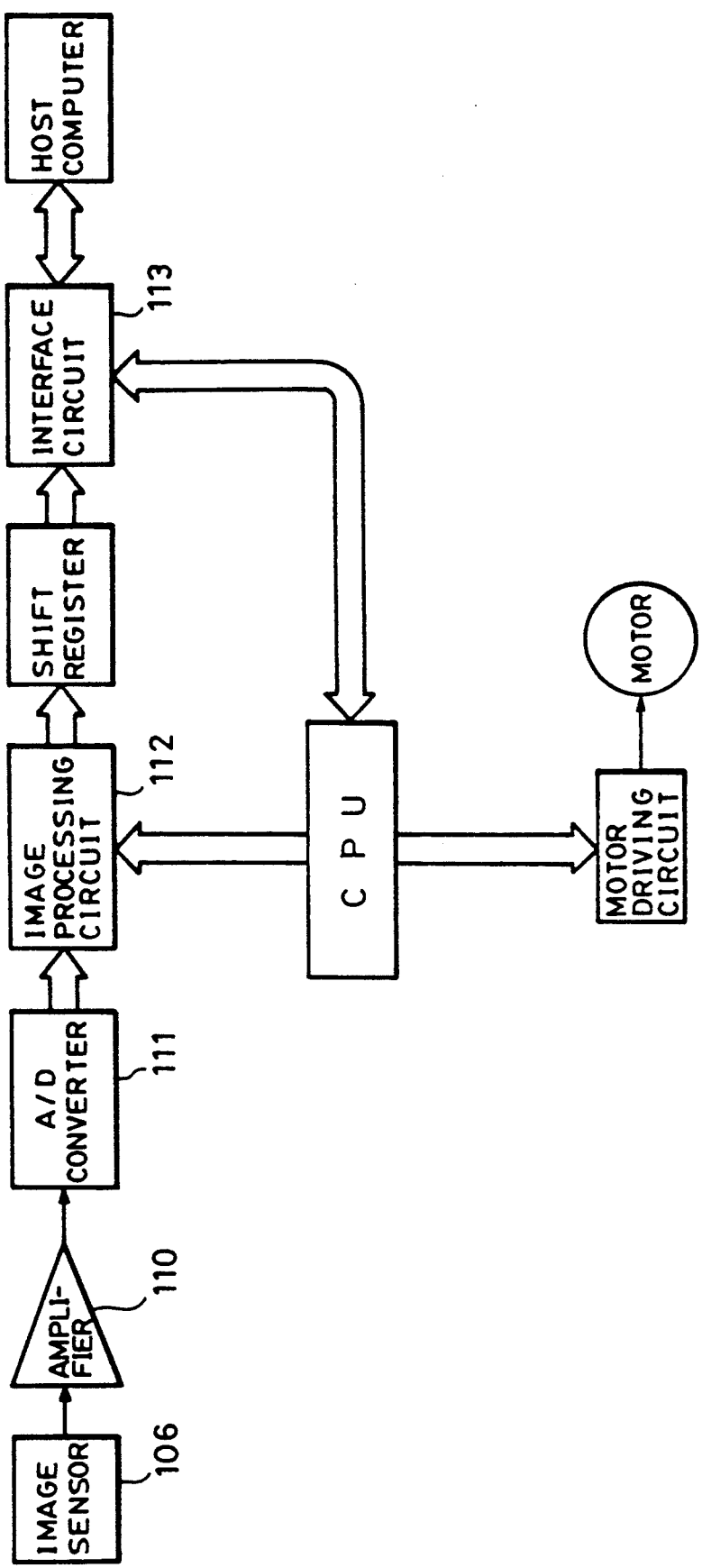
FIG. 6 is a block diagram showing processing in the conventional original reading device.

FIG. 3(a) is a diagram showing a reading scanning unit of the present embodiment, as seen from below. FIG. 3(b) is a side view of the reading scanning unit. FIG. 4(a) is a diagram showing a base cover unit, as seen from above. FIG. 4(b) is a side view of the base cover unit.

As shown in FIGS. 3(a) and 3(b), the assembling operation of the present embodiment is the same as in the first embodiment until the respective components from the first scanning unit 9 to the lens unit 12 are mounted, and magnification and the reading position are adjusted. These components constitute an optical reading scanning unit 28. In the present embodiment, however, as shown in FIGS. 4(a) and 4(b), the driving unit 22 comprising the motor 21 and the reduction gear train is mounted on a base cover unit 29. Accordingly, when the optical reading scanning unit 28 is turned, the original-mount glass 2 is mounted thereon, and the optical reading scanning unit 28 is mounted on the base cover unit 29, the final stage of the reduction gears of the driving unit 22 meshes with a gear portion of the driving pulley 14 provided on the optical reading scanning unit 28. Finally, the upper cover 27 is mounted, and thus the assembling operation of the device is completed.

According to the above-described configuration of the present embodiment, since the motor is isolated from the optical reading scanning unit, less motor vibration is transmitted to the lens and the CCD. Hence, reading accuracy is not reduced. Furthermore, since the weight of the motor is not applied to the lens cover, the shock on the lens cover due to vibration or dropping during transportation is reduced. Hence, the present embodiment has the effect of preventing reduction of the positional accuracy of reading components.

While the present invention has been described with resspect to what are presently considered to be the preferred embodiments, it is to be understood that the invention is not limited to the disclosed embodiments. The present invention is intended to cover various modifications and equivalent arrangements included within the spirit and scope of the appended claims.

What is claimed is:

1. An original reading device, comprising:
   an original mount for mounting an original;
   a reading scanning system for reading the original mounted on said original mount by scanning the original; and
   a single unitary frame for supporting said original mount, said original mount being directly mounted on said frame and said reading scanning system being directly mounted on said frame at a back side of said frame.

2. A device according to claim 1, wherein said frame comprises a base frame of said reading scanning system.

3. A device according to claim 1, wherein said frame comprises an external frame surrounding said original mount.

4. A device according to claim 1, wherein said reading scanning system comprises a first scanning unit provided with a light source and a first mirror, a second scanning unit provided with second and third mirrors for reflecting light from said first scanning unit, a lens for focusing light from said second scanning unit, a photosensitive member for receiving light passing through said lens, a guide member for guiding the movement of said first and second scanning units, and driving means for driving said first and second scanning units.

5. A device according to claim 4, wherein said driving means comprises a driving motor which is mounted on a portion different from said frame.

6. A device according to claim 5, wherein said driving motor is mounted on a base cover of the main body of the device.

7. An original reading device, comprising:
a single unitary frame;
a first scanning unit directly mounted on said frame, and a second scanning unit directly mounted on said frame;
an original mount directly mounted on said frame;
a lens cover attached to said frame;
a base cover unit directly mounted on said frame; and
an upper cover directly mounted on said frame.

8. An original reading device as recited in claim 7, further comprising a charge-coupled device unit mounted on said lens cover.

9. An original reading device as recited in claim 8, wherein said charge-coupled device unit on the lens cover comprises a lens and a charge-coupled device.

10. An original reading device as recited in claim 7, wherein said first and second scanning units are mounted on said frame by mounting said first and second scanning units along guide members attached to said frame.

11. An original reading device as recited in claim 7, further comprising a driving unit mounted on said frame.

12. An original reading device as recited in claim 11, wherein said driving unit further comprises a motor and a reduction gear train.

13. A method of using an original reading device, comprising the steps of:
placing an original on an original mount; and
scanning the original using a reading scanning system;
wherein the original mount and the reading scanning system are directly mounted on a single unitary frame.

14. A method of assembling an original reading device comprising the steps of:
mounting a first scanning unit and a second scanning unit directly onto a single unitary frame;
turning the frame and the components attached thereto;
mounting an original mount directly onto the frame;
mounting the frame directly onto a base cover unit; and
mounting an upper cover directly on the frame.

15. A method of assembling an original reading device as recited in claim 14, further comprising the step of mounting a lens cover on the frame.

16. A method of assembling an original reading device as recited in claim 15, wherein the step of mounting the frame on a base cover unit includes meshing reduction gears of a reading scanning system driving unit mounted on the base cover unit with a gear portion o a driving pulley mounted on a shaft wherein said shaft is attached to the lens cover.

17. A method of assembling an original reading device as recited in claim 15, further comprising the step of mounting a charge-coupled device unit on the lens cover.

18. A method of assembling an original reading device as recited in claim 17, wherein the step of mounting the charge-coupled device unit on the lens cover includes the step of adjusting magnification and reading position of a lens and a charge-coupled device in the charge-coupled device unit.

19. A method of assembling an original reading device as recited in claim 14, wherein the step of mounting the first and second scanning units onto a frame includes assembling the first and second scanning units along guide members attached to the frame.

* * * * *

UNITED STATES PATENT AND TRADEMARK OFFICE
CERTIFICATE OF CORRECTION

PATENT NO. : 5,311,015
DATED : May 10, 1994
INVENTOR(S) : YUKITOSHI TAKEUCHI

It is certified that error appears in the above-identified patent and that said Letters Patent is hereby corrected as shown below:

COLUMN 3

Line 28, "of of" should read --of--.

COLUMN 4

Line 46, "resspect" should read --respect--.

COLUMN 6

Line 26, "o" should read --of--.

Signed and Sealed this

Thirteenth Day of December, 1994

Attest:

BRUCE LEHMAN

Attesting Officer      Commissioner of Patents and Trademarks